United States Patent Office 2,837,468
Patented June 3, 1958

2,837,468

PURIFICATION OF POLYHYDRIC ALCOHOLS

Robert J. Ruhf, Allentown, Pa., assignor to Trojan Powder Company, a corporation of New York No Drawing. Application December 23, 1955
Serial No. 554,916

6 Claims. (Cl. 202—52)

This invention relates to the purification of polyhydric alcohols. More particularly, it relates to an improved method for the purification of those polyhydric alcohols which are basically tetra-substituted methanes of which trimethylolethane, trimethylolpropane, and 2,2-dimethyl-1,3-propanediol are examples. These polyols are of the type formula $R_{4-n}C(CH_2OH)_n$, in which R represents a saturated alkyl or alkoxy group with not more than 4 carbon atoms in its primary chain and $n$ is 2, 3 or 4. When $n$ is 2, the R groups need not be identical.

This application is a continuation in part of my application Serial No. 466,951, filed November 4, 1952, now abandoned.

The polyols of kind described decompose when their distillation is attempted. This decomposition occurs under such widely varying conditions as alkaline, neutral, or strongly acid, even at pressures of distillation as low as 1 mm. of mercury.

I have now discovered that the distillation may be performed satisfactorily and with little or no decomposition when the pH of the polyol composition being distilled is made slightly below 7 but not below 5, so that the pH during distillation of the polyol is, for instance, from 5 to 6.7. With such pH control, the distillation may be effected in fact at pressures up to 50 mm. of mercury or so, with the correspondingly higher temperatures that are much above those that have been found to cause decomposition at pH levels above 7 or more or substantially below 5. Distillation of trimethylolpropane, for example, at 1 mm. pressure, under either neutral or alkaline conditions, gave objectionable decomposition; yet the distillation at pH 6 gave a good yield of purified product and at 136°–140° C. The distillation temperature at 50 mm. mercury was within the range 190°–205° C. The boiling point of the product ranged from 146°–150° C./3 mm. to 160°–165° C./5 mm. In all cases the residue on ignition of the product was very low.

The acids used to establish the pH may be either inorganic or organic, for the distillation as illustrated in the following specific examples of the practice of the invention. The equipment for distillation used is conventional and, therefore, not shown.

In all these examples, the water or other solvent originally present is removed, suitably as a forerun before the polyol itself is distilled. As a result, the mixture subjected to distillation is substantially anhydrous. The mixture includes the polyol in solvent-free form and acid added in any amount required to establish the pH within the range 5–6.7 during distillation of the said polyol. Such pH is maintained during the distillation. It is ordinarily not necessary, for this maintenance of pH, to add any additional acid or other material once the distillation is begun.

Example 1

200 g. of a concentrated trimethylolpropane reaction liquor (pH above 8) was treated with a calculated amount of 4.2 g. of oxalic acid crystals $(COOH)_2 \cdot 2H_2O$ in 10 ml. of water to combine with all the calcium in the liquor. The resulting mixture had a pH of approximately 6 after the more volatile forerun was distilled away. The polyol was distilled at 146°–151° C. and 3 mm. The yield was 132.4 g. (66.2%) of very pure trimethylolpropane. The residue on ignition of this material was slight and the material left in the flask after distillation had a hydroxy content (OH) of about 25%.

Example 2

To 200 g. of a concentrated trimethylolpropane reaction liquor with a pH above 8, 7.5 g. of oxalic acid was added. The resulting mixture, of pH approximately 6 at the start of the distillation of the polyol, was distilled and a fraction of 132.1 g. (66.05%) boiling at 155°–160° C./5 mm. was collected. This very pure material had a residue on ignition of 0.00%. The material left in the flask after distillation had an OH value of over 20%.

Example 3

To the residue left in the flask from Example 2 there were added 300 g. of the same reaction liquor and 10 g. oxalic acid. The fraction boiling at 160°–165° C./5 mm. was collected. This weighed 227 g. (75.7%) and had a residue on ignition of 0.00%.

Example 4

400 g. of a concentrated trimethylolpropane reaction liquor with a pH of approximately 8, which could not be distilled satisfactorily under conventional conditions, was acidified with formic acid. Distillation was attempted. Decomposition began, however, at about 140° C./5 mm. This material was cooled and found to have a pH value of between 7 and 8. 10 g. of concentrated $H_2SO_4$ in 20 g. $H_2O$ was then added. This reduced the pH to 6 after removal of the water by distillation. Distillation of the remaining polyol then proceeded smoothly. The fraction boiling up to 162° C./5 mm. was collected. This weighed 285.8 g. (71.86%). It was very pure. The residue on ignition was less than 0.01%.

Example 5

The total reaction mixture resulting from the condensation of 89.5 g. of 82.7% methoxyacetaldehyde with 4 mole equivalents of formaldehyde was neutralized with phosphoric acid so that the pH did not rise above 6.5 during the subsequent distillation of the polyol. From this mixture 41.3 of crystalline material separated out. The mother liquor was then distilled. The main portion of the distillate came over at 167° C./7 mm. This portion weighed 33.7 g. It was methoxytrimethylolmethane, a liquid which crystallized on refrigeration. The total yield obtained was 75 g. or 55% of theory.

Example 6

The procedure of Example 1 was followed except that the oxalic acid was added in amount to establish the pH at 5 during distillation of the polyol. The polyol distilled at 5 mm. without objectionable decomposition.

Example 7

The distillation pressure in this example is 1–5 mm. of mercury and the temperature of distillation is the boiling point of the selected polyol under the pressure used. The polyol was mixed in wet condition with oxalic acid in such amount that the pH value should remain at not below 5 or over 6.5 during distillation of the polyol. The whole was then distilled, first to remove the water and then under the reduced pressure stated to distill the polyol.

The polyol used in this example is any one selected from the group consisting of trimethyolethane, trimethylolpropane, trimethylolbutane, trimethylolmethoxymethane, trimethylolethoxyethane, and trimethylolbutoxymethane.

It is to be understood that it is intended to cover all changes and modifications of the examples of the invention herein chosen for the purpose of illustration which do not constitute departures from the spirit and scope of the invention.

What I claim is:

1. In purifying polyols of the general type formula $R_{4-n}C(CH_2OH)_n$ wherein R represents monovalent units containing each not more than 4 carbon atoms selected from the group consisting of alkyl and alkoxy groups and $n$ is an integer within the range 2–4, the process which comprises introducing into the polyol an acid in any amount required to establish the pH of the resulting mixture approximately within the range 5–6.7 during the distillation of the polyol, subjecting the mixture in substantially anhydrous condition to distillation at a temperature of 136°–206° C. and at a pressure corresponding to not more than about 50 mm. of mercury, and maintaining the pH in the said mixture during the distillation of the polyol within the said range.

2. The process of claim 1 in which R represents an alkyl group containing not more than 4 carbon atoms.

3. The process of claim 1 in which R represents an alkoxy group containing not more than 4 carbon atoms.

4. The process of claim 1 in which the said polyol is trimethylolethane.

5. The process of claim 1 in which the said polyol is trimethylolpropane.

6. The process of claim 1 in which the said polyol is trimethylolmethoxymethane.

References Cited in the file of this patent

UNITED STATES PATENTS

| | | |
|---|---|---|
| 2,333,696 | Bludworth | Nov. 9, 1943 |
| 2,381,855 | Spence et al. | Aug. 7, 1945 |